United States Patent [19]

Shibayama

[11] Patent Number: 4,598,957

[45] Date of Patent: Jul. 8, 1986

[54] ROLLING BODY FITTED TO A HOLDER

[75] Inventor: Kiyomi Shibayama, Gumma, Japan

[73] Assignee: NSK Torrington Company, Ltd., Tokyo, Japan

[21] Appl. No.: 547,746

[22] Filed: Nov. 1, 1983

[30] Foreign Application Priority Data

Nov. 20, 1982 [JP] Japan .................................. 57-176405

[51] Int. Cl.[4] ........................................... F16C 29/04
[52] U.S. Cl. .................................................... 384/51
[58] Field of Search ............... 308/6 R, 199, 200, 235, 308/3 A, 227, 231

[56] References Cited

U.S. PATENT DOCUMENTS

| 864,409 | 8/1907 | Edwards | 308/217 |
|---|---|---|---|
| 2,417,559 | 3/1947 | Larson | 308/235 |
| 2,502,929 | 4/1950 | Clark | 308/6 R X |
| 3,938,866 | 2/1976 | Martin | 308/235 |
| 3,955,862 | 5/1976 | Batt | 308/235 |
| 4,215,904 | 8/1980 | Teramachi | 308/6 R |

*Primary Examiner*—Stuart S. Levy
*Assistant Examiner*—Lynn M. Sohacki
*Attorney, Agent, or Firm*—Murray Schaffer

[57] ABSTRACT

A linear roller bearing assembly having a base plate formed with a plurality of pockets, in each of which is located a separate holder for a roller or ball. The holder is removably inserted into the pocket and a clearance between the holder and the pocket is provided allowing the holder to freely move so as not to bend.

5 Claims, 12 Drawing Figures

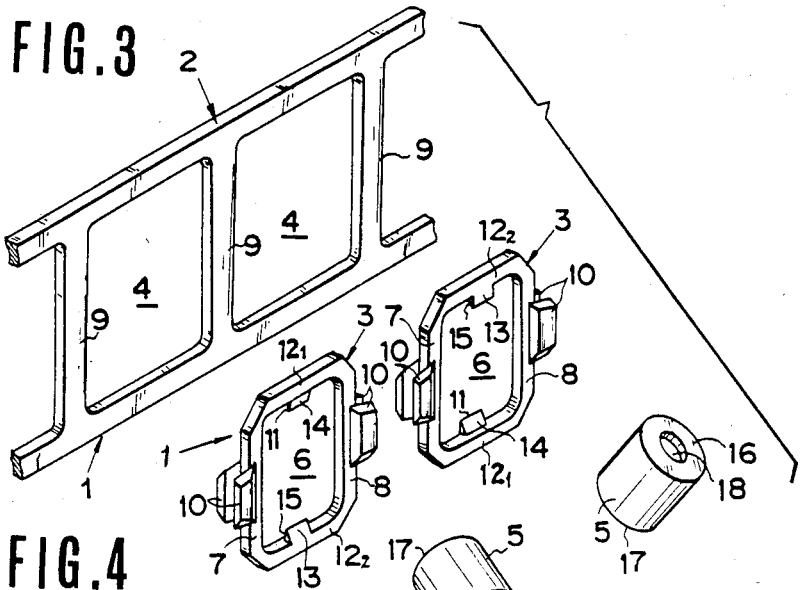
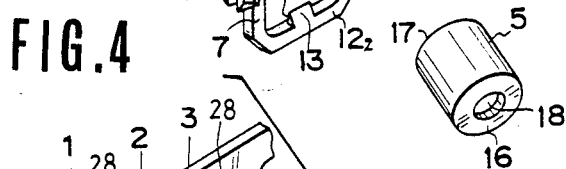
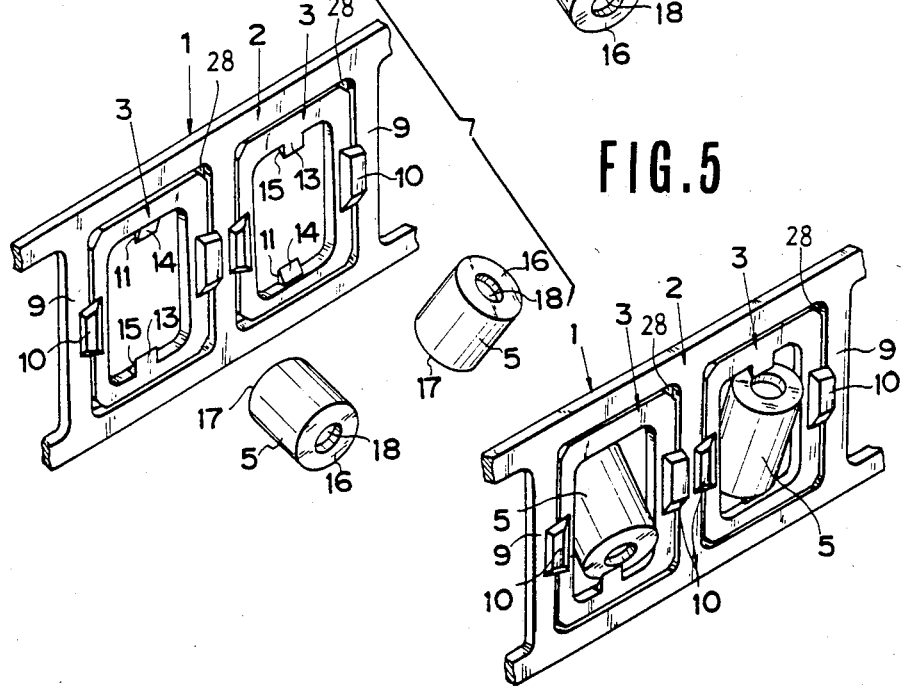

4,598,957

ROLLING BODY FITTED TO A HOLDER

BACKGROUND OF THE INVENTION

This invention relates to a linear roller bearing for use in a linear motion part of a machine tool or industrial machine, and more particularly, a linearly moving guide bearing for arrangement between the grooves of two guide rails.

Linear roller bearings such as are shown in FIGS. 1 and 2 are already known. The roller bearing assembly, generally depicted by the numeral H are arranged between grooves C and D of two guide rails A and B opposed to each other. The guide rails A and B can reciprocate and move along the assembly. When the guide rails A and B move, the roller bodies fitted to the holder of the assembly H move a little with them.

In the assembly of H in FIG. 1, a roller body F is held so as to be rotatable in a holding hole formed in a base plate E. Further, the respective rollers F are reversed in the direction of inclination so as to alternately intersect at right angles with each other.

In the assembly H of FIG. 2 a ball G is rotatably held in a hole I formed in the base plate-shaped holder E. However, the plate E is formed with many holding holes I in a thin metal strip which holes are provided with a holding pawl J for holding the roller F or ball G inside each hole I. Therefore, in forming the hole I and the holding pawl J, the metal plate is likely to be bent or twisted.

Thus, a defect is created by which the plate is deformed so that when the plate E is arranged between the grooves C and D of the guide rails A and B, the plate E will rub against the guide rails A and B and an unreasonable force will be applied to the roller F or ball G. Consequently, it will be difficult for the roller F or ball G to smoothly rotate and it will be hard for the guide rails A and B to move. The longer the strip E, the more pronounced this defect becomes.

Another defect arises in the plate E shown in FIGS. 1 and 2, since the holding pawl J is formed directly in the holding hole I. Thus, even if one of the holding pawls is broken, the entire assembly must be replaced. Therefore, great waste occurs and this type of holder is uneconomical.

OBJECTS AND SUMMARY OF THE INVENTION

An object of the present invention is to provide a linear roller bearing assembly in which roller bodies are fitted to a base plate so that the guide rails A and B can move smoothly.

More particularly, the present invention has it as an object the provision of an assembly H fitted to a holder wherein a base plate E does not rub with guide rails A and B and rollers F or balls G are held in the base plate so they can rotate smoothly.

Another object of the present invention is to provide a linear roller bearing assembly, wherein even if one holding pawl J in any part of the base plate E is broken, it will not be necessary to replace the entire assembly but only the broken part.

The assembly of the present invention comprises a base plate in which pockets are formed at regular intervals. Each pocket is provided with a separate roller body holding member, in each of which a roller body is fit. The roller body holding members are removably secured in the respective pocket of the base plate to form an assembly such that rollers or balls are smoothly rotatable.

BRIEF DESCRIPTION OF THE DRAWINGS

In the Drawings:

FIG. 3 is an exploded view showing the base, holding member, and rolling bodies in accord with the present invention;

FIGS. 4 and 5 are partial assembly views showing the rolling bodies fitted to the holding members and base in accord with the present invention;

DETAILED DESCRIPTION OF THE INVENTION

Figure 6:
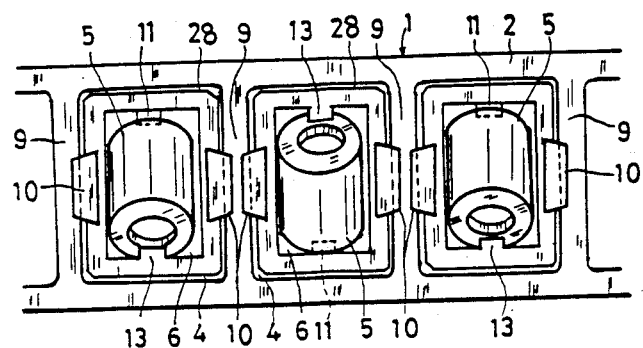
FIG. 6 is an elevational view of the assembly of FIGS. 3 to 5 completed.
Figure 7:
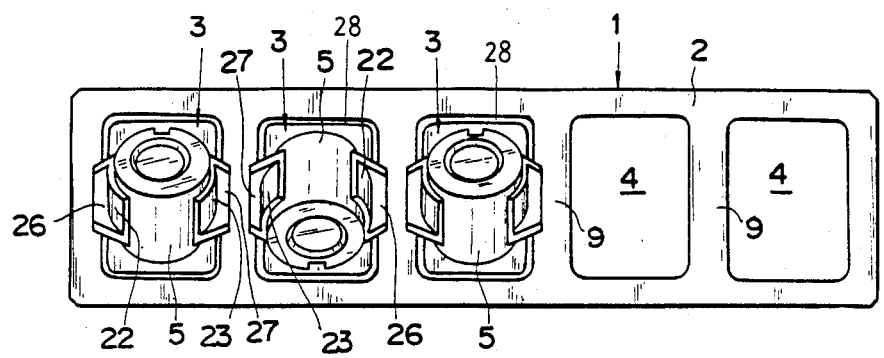
FIG. 7 is an elevational view of another embodiment of a rolling body and holder member in accord with the present invention.

In the present invention, as shown in FIGS. 5, 6, and 7, the assembly, as generally depicted by the numeral 1, is provided comprising a base plate 2 in which holding members, generally depicted by the numeral 3 are removably secured in pockets 4. A rolling body 5 is freely journalled in each holding member 3.

The base plate 2 is an elongated metal plate provided with pockets 4 at regular intervals into which the holding members 3 are placed. The holding member 3 is formed in the shape of a frame of such elastically deformable material as a plastic, hard rubber or flexible metal. The holding member 3 is made a little smaller in outer contour than the pocket 4 in the base plate 2 and with an inner opening 6 into which the roller body fits.

On the outside the transverse side edges 7 and 8 of each of the holding member 3, two pair of juxtaposed tab pieces 10 are provided in opposite longitudinal directions. Each pair of tabs project in parallel to each other so as to be fitted over the peripheral edge 9 of the pocket 4.

As seen in FIG. 4, inside the upper lateral edge $12_1$ of the holding member 3 there is provided a holding pawl 11 projecting inwardly of the pocket 4. Inside the lower edge $12_2$ a second holding pawl 13 is provided also projecting inwardly. Each of the pawls 11 and 13 have sloping surfaces 14 and 15 opposed to each other and tapered toward the inside. As seen in FIG. 3, adjacent holding members 3 are of the same structure, but are arranged serially reversed to each other so that the pawls 11 and 13 are alternatively staggered. The rolling body 5 is shaped to be in the form of a cylindrical roll having both end surfaces 16 and 17 formed with a central recess 18, into which the pawls 11 and 13 fit. The slope of the pawls causes the roller bodies to be inclined with respect to the plane of the plate 2.

Figure 8A:
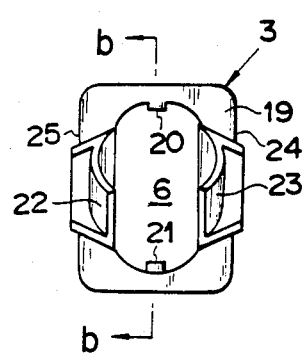
FIG. 8A is an elevational view of a component part of a rolling body fitted to a holder.
Figure 8B:
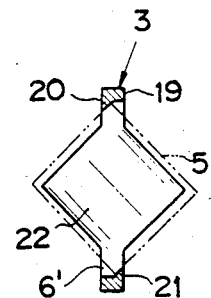
FIG. 8B is a sectioned view on line b—b in FIG. 8A.
Figure 8C:
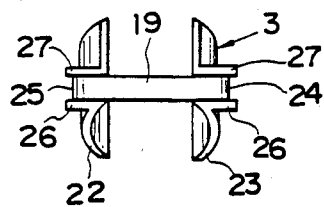
FIG. 8C is a plan view of the component part in FIG. 8A.

The rolling body 5 may be, for example, ball-shaped instead of a cylindrical roll. The holding member 3 shown in FIGS. 7 and 8 is different in structure from the rolling body holding member 3 shown in FIGS. 3 to 6. Here the holding member 3 is formed of such elastically deformable material as, for example, a hard plastic, in the form of a plate or flat member 19 having a hole 6'. The upper edge of the hole 6' is provided with a downward directed pawl 20 and while the lower edge of the hole 6' is formed with an upward directed pawl 21. Each pawl projects toward the other with an incline, slanted with respect to each other, toward the center of the hole.

The base plates 19 are each held by side pieces 22 and 23 which form with arcuate inner directed tabs adapted to hold the rolling body 5. These holding tabs 22 and 23 are inclined by about 45 degrees obliquely to the rear surface from the front surface of the base plate 19 so as to be able to obliquely hold the rolling body 5. Further, the holding pieces 22 and 23 are curved outward so as to be able to enclose and hold the cylindrical roll-shaped rolling body 5 on the outer peripheral surface of the holder 1.

On both outer sides of the holding tabs 22 and 23 fitting tabs 26 and 27 projecting parallel to each other from both right and left side surfaces 24 and 25 of the plates 19, so that the peripheral edge 9 of the pocket 4 can be secured between the fitting pieces 26 and 27.

In order to fit the holding member 3 of FIG. 3, to the pocket 4 in the base plate 2, as in FIG. 4, the rolling body holding member 3 is pushed into the pocket 4 so that the peripheral edge 9 fits between the two parallel fitting pieces 10.

In order to fit the rolling body holding member 3 of FIG. 8, to the pocket 4, as in FIG. 7, the holding member 3 is pushed into the pocket 4 in the base plate 2 so that the peripheral edge 9 may fit between the two parallel fitting pieces 26 and 27.

The rolling body holding members 3 in FIG. 7 are fitted to the holding member pockets 4 in the base plate 2 so as to be alternately reversed in the vertical direction.

As the holding member 3 is made a little smaller in outer contour than the pocket 4, a clearance 28 will be formed between the outer periphery of the holding member 3 and the peripheral edge 9 of the hole 4 as seen in FIGS. 6 and 7, so that the holding member 3 will be movable in this clearance 28 in any of the vertical, horizontal and oblique directions.

In order to fit the rolling body in the holding member 3 as in FIG. 5, the rolling body is inclined and pushed into the hole 6 so as to be held on the end surfaces 16 and 17 by the holding pawls 11 and 13. In this case, the rolling bodies 5 will be fitted to the respective rolling body holding members 3 as inclined by about 45 degrees so that their vertical directions may alternately intersect at right angles with each other. The rolling body 5 thus held in the hole 6 can rotate freely.

As the rolling body 5 is formed to be a little longer than the distance between the holding pawls 11 and 13 as seen in FIGS. 4 and 5, the holding pawls 11 and 13 will be elastically deformed during installation of the rolling body 5 and thereafter the rolling body 5 will be easily held by the holding pawls 11 and 13.

In order to assemble the rolling body 5 to the holder 1 as seen in FIG. 7 the rolling body 5 is inserted in the holding member 3 as seen in FIG. 8, before the holding member 3 is fitted to the base plate 2, and then the rolling body holding member 3 is fitted into the pocket 4 in the base plate 2.

In order to fit the rolling body 5 to the holding member 3 shown in FIG. 8, the rolling body 5 is inclined and pushed in between the holding pieces 22 and 23 so as to be held on the end surfaces 16 and 17 by the pawls 20 and 21. In this case, the rolling bodies 5 will be inclined by 45 degrees so that their vertical directions may alternately intersect at right angles with each other. The rolling body 5 held in the rolling body holding hole 6 can rotate freely.

As the rolling body 5 is formed to be a little longer than the distance between the holding pawls 20 and 21, the holding pawls 20 and 21 will be elastically deformed.

In case the rolling body 5 is ball-shaped, the shapes and structures of the holding pawls 11, 13, 20 and 21 and holding pieces 22 and 23 of the rolling body holding members 3 will be adpated to hold the balls.

The present invention has various and advantageous effects as in the following:

(a) As the holder 1 is formed of the separately formed base plate 2 and holding members 3 and the holding pawls 11, 13, 20 and 21 are formed on the holding members 3, there will be no need of forming holding pawls on the base plate 2 itself and therefore the base plate 2 will be neither bent nor twisted.

Figure 1:
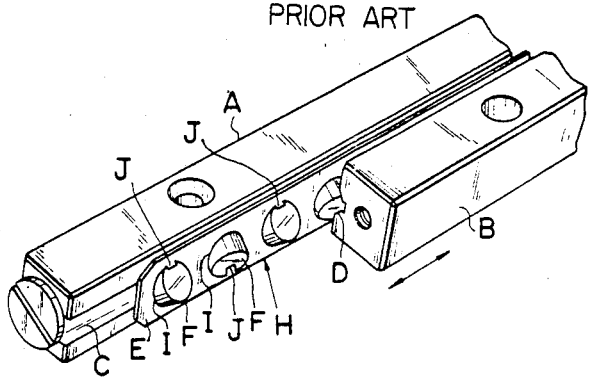
FIG. 1 is a perspective view of a conventional linearly moving guide.
Figure 2:
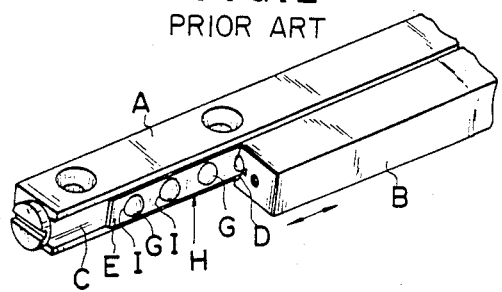
FIG. 2 is a perspective view of another conventional linearly moving guide.

Therefore, when the rolling body is arranged between the grooves C and D of the guide rails A and B as in FIG. 1, the holder 1 will not rub against the guide rails A and B and no unreasonable force will be substantially applied to the rolling body 5. Therefore, the rolling bodies 5 will rotate smoothly and the guide rails A and B will move smoothly.

(b) When any of the holding pawls 11, 13, 20 and 21 is broken or cracked, only the holding member 3 on which they are found need to be replaced, therefore, there will be no waste and it will be economical.

(c) Since the holding member 3 is formed of an elastically deformable material, it will be easy to fit the holding member to the pocket 4 and to fit the rolling body 5 into the holding hole 6.

Further, as the rolling body holding member 3 is positively fitted to the pocket 4, it will be hard to remove it from the pocket 4. As the rolling bodies 5 held by the holding pawls 11, 13, and 20, 21 are also positively held by the elasticity of the holding pawls, they will also be hard to remove.

Figure 9:
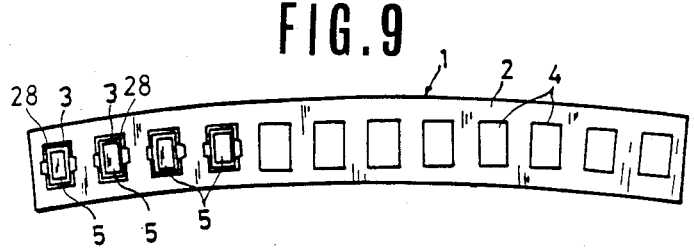
FIG. 9 is an elevational view of rolling bodies fitted to a curved base.
Figure 10:
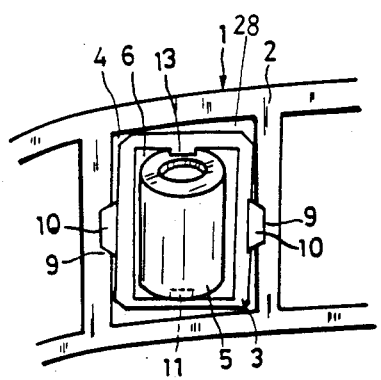
FIG. 10 is an enlarged elevational view showing the detail of the rolling body holder member and base of FIG. 9.

(d) The clearance 28, formed as in FIG. 6 between the pocket 4 and the holding member 3 fitted to it mentioned in claim 3 within the range of the clearance 28, the rolling body enables the holding member 3 to move freely in any of the vertical, horizontal and oblique directions and therefore the following special effects are obtained. If the rolling body, fitted to the holder in which the base plate 2 is slightly curved upward as in FIG. 9, is arranged as it is between the grooves C and D of the guide rails A and B as in FIG. 1, a pushing force in the direction reverse to the curving direction of the base plate 2 will be applied to the rolling body 5 and will be transmitted to the rolling body holding member 3 from the rolling body 5, the rolling body holder 3 will change the direction within the range of the clearance 28 as in FIG. 10. The rolling body 5 will become parallel with the grooves C and D of the guide rails A and B, and therefore, no unreasonable force will be applied to the rolling body and the rolling body will rotate smoothly.

(e) In case rollers are used for the rolling bodies 5 and are fitted to the respective rolling body holding holes 6 in the rolling body holding members 3 as inclined alternately in the reverse directions, the rolling bodies 5 will be in line-contact with the grooves C and D of the guide rails A and B and therefore will be high in rigidity.

I claim:

1. A linear roller bearing assembly comprising an elongated base plate having a plurality of pockets spaced along the length thereof, a roller holder removably mounted in each pocket with clearance between the outer peripheral edge of said holder and the inner peripheral edge of said pocket so that said holder is movable within said clearance, and a roller body located in each holder, each of said holders comprising a frame, conforming in outer peripheral shape to that of said pocket, said frame having two pair of tabs extending outwardly on opposite sides thereof, said tabs being adapted to be snapped on to the corresponding peripheral edges of said base plate in opposition to said sides when said holders are located in said pockets and means for retaining said respective roller bodies in said holders comprising a pawl extending inwardly from opposite lateral sides of said frame in engagement with respective frontal ends of said roller bodies wherein said opposing pawls have sloping walls inclined with respect to each other in opposite directions to hold said roller bodies at an angle along an axis inclined with respect to said base plate.

2. The assembly according to claim 1 wherein said holders are formed of elastic material.

3. The assembly according to claim 1 wherein said holders are formed of metal and are flexible.

4. The assembly according to claim 1 wherein said holders and roller bodies are arranged so that the roller bodies are inclined alternately in the reverse direction along the length of said plate.

5. The assembly according to claim 1 when said tabs include arcuate extensions adapted to surround in part said roller bodies.

* * * * *